(12) United States Patent
Chickering et al.

(10) Patent No.: US 7,143,075 B1
(45) Date of Patent: Nov. 28, 2006

(54) AUTOMATED WEB-BASED TARGETED ADVERTISING WITH QUOTAS

(75) Inventors: David Maxwell Chickering, Bellevue, WA (US); David E. Heckerman, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1094 days.

(21) Appl. No.: 09/799,269

(22) Filed: Mar. 6, 2001

Related U.S. Application Data (63) Continuation-in-part of application No. 09/565,583, filed on May 4, 2000, now Pat. No. 6,665,653, which is a continuation-in-part of application No. 09/430,767, filed on Oct. 29, 1999.

(60) Provisional application No. 60/142,330, filed on Jul. 3, 1999.

(51) Int. Cl.
*G06N 5/00* (2006.01)
(52) U.S. Cl. .......................................... 706/47; 706/45
(58) Field of Classification Search ................. 706/47, 706/45; 705/14; 725/35, 42; 707/100
See application file for complete search history.

(56) References Cited

U.S. PATENT DOCUMENTS

| | | | |
|---|---|---|---|
| 2,295,102 A | | 9/1942 | Fisher |
| 5,588,056 A | | 12/1996 | Ganesan |
| 5,635,978 A | * | 6/1997 | Alten et al. .................... 725/42 |
| 5,848,397 A | | 12/1998 | Marsh et al. .................. 705/14 |
| 5,850,448 A | | 12/1998 | Ganesan |
| 5,864,848 A | | 1/1999 | Horvitz |
| 5,956,693 A | | 9/1999 | Geerlings |
| 6,026,369 A | | 2/2000 | Capek .......................... 705/14 |
| 6,032,123 A | | 2/2000 | Jameson |
| 6,055,510 A | | 4/2000 | Henrick et al. ............... 705/14 |
| 6,128,663 A | | 10/2000 | Thomas ....................... 709/228 |
| 6,134,532 A | | 10/2000 | Lazarus et al. ............... 705/14 |
| 6,182,050 B1 | | 1/2001 | Ballard |
| 6,286,005 B1 | * | 9/2001 | Cannon ...................... 707/100 |
| 6,327,581 B1 | | 12/2001 | Platt |
| 6,463,585 B1 | * | 10/2002 | Hendricks et al. ............. 725/35 |
| 6,665,653 B1 | | 12/2003 | Heckerman et al. |
| 6,876,974 B1 | * | 4/2005 | Marsh et al. .................. 705/14 |
| 2003/0086413 A1 | | 5/2003 | Tartarelli et al. |

OTHER PUBLICATIONS

Gabriel Matsliach, "Performance Analysis of File Organizations That Use Multi-Bucket Data Leaves With Partial Expansions (extended abstract)", Proceedings of the 10th ACM SIGACT-SIGMOD-SIGART Symposium on Principles of Database Systems, Apr. 1991, p. 16.

J. Platt, "Fast Training of SVM's using Sequential Minimal Optimization", 1998, MIT Press, Baltimore.

M. Sahami, et al., "A Bayesian Approach to Junk E-Mail Filtering", AIII Technical Report WS-98-05, Jul. 1998.

(Continued)

*Primary Examiner*—Wilbert L. Starks, Jr.
(74) *Attorney, Agent, or Firm*—Amin & Turocy, LLP (57) ABSTRACT

The invention provides systems and methods that can be used for targeted advertising. The system determines where to present impressions, such as advertisements, to maximize an expected utility subject to one or more constraints, which can include quotas and minimum utilities for groups of one or more impression. The traditional measure of utility in web-based advertising is click-though rates, but the present invention provides a broader definition of utility, including measures of sales, profits, or brand awareness, for example. This broader definition permits advertisements to be allocated more in accordance with the actual interests of advertisers.

19 Claims, 6 Drawing Sheets

OTHER PUBLICATIONS

Chickering, et al.; "Targeted Advertising with Inventory Management", EC'00, 2000, p. 1-5.

Chickering, et al.; "A Decision Theoretic Approach to Targeted Advertising", Microsoft Research, p. 1-7.

Chickering, et al.; "Goal-Oriented Clustering", Technical Report, May 2000, p. 1-9.

Heckerman, David; "A Tutorial on Learning with Bayesian Networks", Technical Report, Mar. 1995, p. 1-57.

Langheinrich, M., et al.; "Unintrusive Customization Techniques for Web Advertising", http://www8.org/w8-papers/2b-customizing/unintrusive/unintrusive.html, Viewed Nov. 28, 2000, p. 1-19.

Dedrick, R.; *"A Consumption Model for Targeted Electronic Advertising", IEEE Multimedia,* vol. 2, No. 2, Summer 1995, p. 41-49.

Yager, R.R.; *"Targeted e-commerce marketing using fuzzy intelligent agents", IEEE Intelligent Systems,* vol. 15, No. 6, Nov.-Dec. 2000, p. 42-45.

Charikar, M., et al.; *"On Targeting Markov Segments", Proceedings of the Thirty-First Annual ACM Symposium on Theory of Computing,* 1999, p. 99-108.

* cited by examiner

AUTOMATED WEB-BASED TARGETED ADVERTISING WITH QUOTAS

This application is a Continuation-in-Part of U.S. patent application Ser. No. 09/565,583, filed May 4, 2000, now U.S. Pat. No. 6,665,653, entitled, "NOISE REDUCTION FOR A CLUSTER-BASED APPROACH FOR TARGETED ITEM DELIVERY WITH INVENTORY MANAGEMENT," which is an application claiming benefit under 35 U.S.C. 119(e) of U.S. Provisional Patent Application No. 60/142,330, filed Jul. 3, 1999, entitled, "CLUSTER-BASED APPROACH FOR TARGETED ITEM DELIVERY WITH INVENTORY MANAGEMENT," and which is a Continuation-in-Part of co-pending U.S. patent application Ser. No. 09/430,767, filed Oct. 29, 1999, entitled, "CLUSTER-BASED AND RULE-BASED APPROACH FOR AUTOMATED WEB-BASED TARGETED ADVERTISING WITH QUOTAS," which is an application claiming benefit under 35 U.S.C. 119(e) of U.S. Provisional Patent Application No. 60/142,330, filed Jul. 3, 1999, entitled, "CLUSTER-BASED APPROACH FOR TARGETED ITEM DELIVERY WITH INVENTORY MANAGEMENT." The entireties of the aforementioned applications are incorporated herein by reference. This application is also related to co-pending U.S. patent application Ser. No. 11/047,276, filed Jan. 31, 2005, entitled, "AUTOMATED WEB-BASED TARGETED ADVERTISING WITH QUOTAS."

TECHNICAL FIELD

The present invention generally relates to targeted advertising and in particular relates to targeted advertising systems and methods that respect quotas.

BACKGROUND OF THE INVENTION

The Internet has become increasingly popular with end users, to the extent that advertisers have become attracted to this medium. A typical type of Internet ad is known as the banner ad, which is generally displayed at the top of a web page. Operators for popular news and other sites, for example, can increase revenue by selling banner ad space to advertisers.

Advertisers generally choose sites on which to purchase banner ad space based on one of two criteria. On the one hand, advertisers pay to have their ads shown to specific types of people. For example, a golf store might want to have its ads shown on a sports-related page, or to people who are likely to be interested in golf based on their browsing history.

On the other hand, advertisers pay to have their ads served in such a way that they are likely to be "clicked on", so that the user will be transported to the advertiser's web site. One way to increase revenue generated from web advertising is thus to increase the "click through" rate of the ads shown. The click through rate of an ad is the frequency with which a user clicks on the ad to be transported to the advertiser's web site. Advertisers are attracted to sites that generate click through, and are usually willing to pay extra to those sites that can deliver increased click through. Targeted advertising is the practice of showing ads to individuals based on information about them, such as their web browsing history and demographics, to increase the click through rate.

A difficulty with targeted advertising is that advertisers familiar with the former criteria frequently specify quotas for the number of time their ads are to be shown. Sites sell ad space to many different advertisers, and contracts with all of these advertisers must be fulfilled regardless of the click through rates of the individual ads.

Regardless of which criteria is used, the allocation of advertisements must respect the capacity limitations of the ad space providers. There are limited numbers of opportunities to present ads on particular groups of cites. For example, there are a limited number of daily visits to sports-related web pages.

As demonstrated by the present invention, there has been an unrecognized potential to realize the benefits of targeted advertising while respecting quotas and to more effectively utilize available advertising capacity thus increasing value to advertisers and allowing content providers to charge more for their advertising space.

SUMMARY OF THE INVENTION

The following is a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention provides systems and methods that can be used for targeted advertising. A system according to one aspect of the present invention determines where to present impressions, such as advertisements, to maximize an expected utility subject to one or more constraints. The traditional measure of utility in web-based advertising is click-though rates, but the present invention provides a broader definition of utility, including measures of sales, profits, or brand awareness, for example. This broader definition permits advertisements to be allocated more in accordance with the actual interests of advertisers.

According to another aspect of the invention, the constraints include capacities and quotas. The use of quotas as constraints reconciles the desire of advertisers to have guarantees as to the number of times their ads will be shown with the potential advantages of targeted advertising. By means of the invention, advertisements can be placed where they will be most effective, subject to the limitations created by quotas and other constraints.

When impressions are allocated to maximize a utility for a group of impressions as a whole, there is a tendency for specific groups of impressions to realize a lower utility than they would otherwise. For example, an allocation that maximizes the total number of click-throughs for an entire group of ads may reduce the number of click-through for the subset of ads belonging to one advertiser. To mitigate this effect, a further aspect of the invention maximizes a utility subject to constraints including constraints setting minimum utilities to be realized by individual ads or groups of ads. This permits the utility of the whole to be increased without unduly penalizing any individual.

Maximizing a utility subject to constraints, such as capacities and quotas, defines an optimization problem. The optimization problems that arise with the invention are generally linear programs that can be solved easily to obtain optimized impression allocations. The invention thereby permits maximum utility to be realized for a group of impressions subject to quotas, capacities, minimum utilities, and other constraints that may be of interests to advertisers or ad space purveyors. Other advantages and novel features of the invention will become apparent from the following detailed description of the invention when considered in conjunction with the drawings. Certain illustrative examples of the invention are described herein in connection with the following description and the annexed drawings. These examples are indicative, however, of but a few of the various ways in which the principles of the invention can be employed.

DETAILED DESCRIPTION OF THE INVENTION

Figure 1:
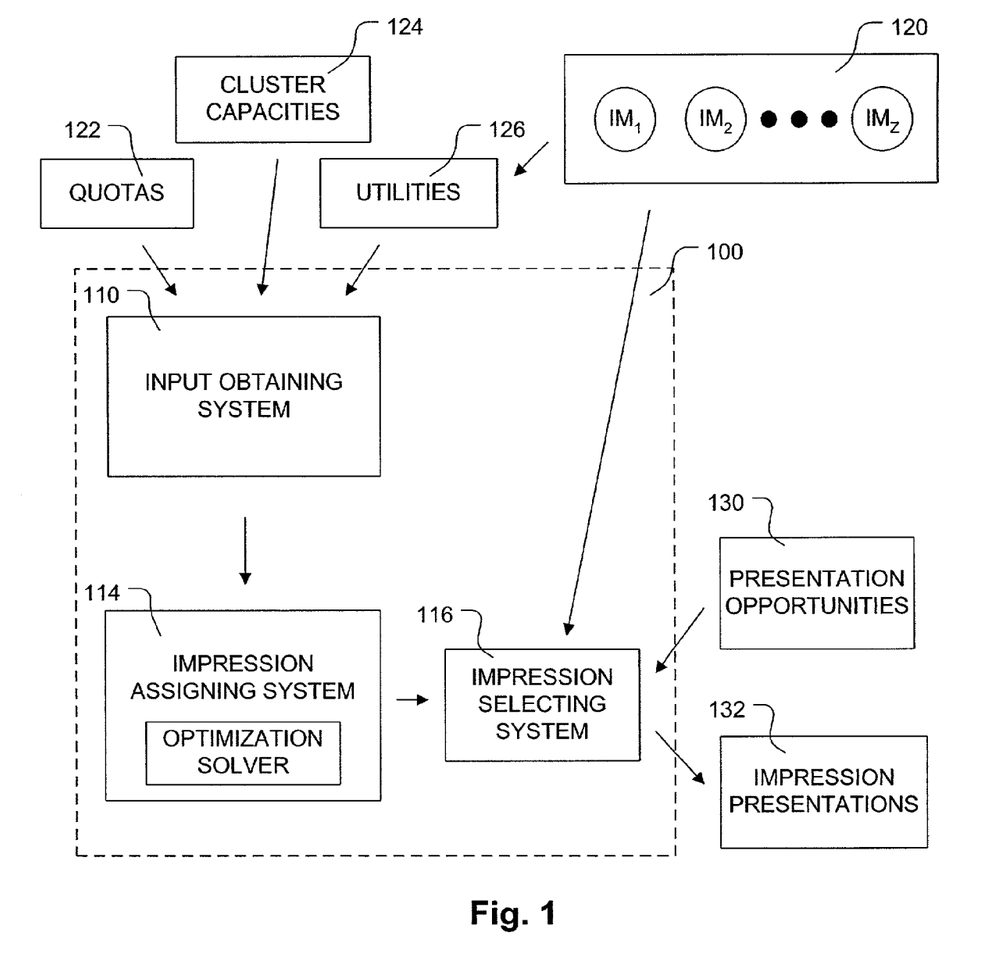
FIG. 1 is a high level schematic of a system provided by one aspect of the present invention.

FIG. 1 is a high level schematic of a system for allocating and selecting impressions 100, which is provided by one aspect of the present invention. The system 100 includes an input system 110, an impression-assigning system 114, and an impression-selecting system 116. The input system 110 gathers input relating to quotas 122, utilities 126, and in most cases, cluster capacities 124. The quotas 122 are requirements giving minimum rates at which impressions 120 are to be presented. The utilities 126 are response rates for the impressions 120 in the various types of presentation opportunities. The cluster capacities 124 are rates of occurrence for clusters (groupings) of presentation opportunities. The impression-assigning system 114 employs the input relating to the utilities 126 and, where appropriate, the input relating to the cluster capacities 124 to effectively allocate the impressions 120 among various types of presentation opportunities while respecting the quotas 122. The impression-selecting system 116 uses the impression assignments in selecting impressions to fill presentation opportunities 130 and generate presentations 132.

The impressions 120 can be anything presented to engender a response. For example, the impressions 120 can be advertisements such as visual advertisements for presentation on a computer or television screen or audio advertisements for presentation over a speaker. In particular, the impressions can be banner advertisements for display on web pages at locations where users requesting the web pages are likely to see the advertisements.

The presentation opportunities 130 are opportunities to present the impressions. For example, the provider of a web page has the opportunity to display banner advertisements along with a requested web page. There can be multiple screen locations at which advertisements can be displayed, thus there can be more than one presentation opportunity for each web page request. The advertisements can also be cycled over time, further increasing the number of presentation opportunities that can arise in response to a single web page request.

Presentation opportunities can be grouped by common characteristics. Characteristics of presentation opportunities can be anything to which the utility of presenting an impression might be correlated. Characteristics can relate to the identity of a probable recipient of the impression and/or the manner in which the impression is presented. Examples include web page subject matter, user demographic information, user browsing history, user buying history, the location on a web page where an impression is displayed, the time for which the impression is displayed, and the time at which the impression is displayed, e.g., when a web page is first displayed, 30 seconds after the page is first displayed, etc.

According to one aspect of the present invention, the presentation opportunities are grouped into clusters such that each presentation opportunity falls into exactly one cluster. The clusters can be defined in any suitable fashion. They can be defined a priori, or alternatively, the clusters definitions can be learned from data. For example, the clusters can be defined a priori to correspond with the news groupings on a news web site (international news, national news, local news, weather, sports, entertainment, etc.) On the other hand, a learning probabilistic model can be used to learn the cluster definitions from data as described in more detail below.

Once the clusters have been defined, the presentation opportunities can be assigned to clusters either manually or automatically. Where the presentation opportunities correspond to users visiting web pages on a news site, this classification is generally a trivial matter; generally, the web pages are already divided into mutually exclusive categories. Even where the web page categories are not mutually exclusive, the users often select one newsgroup or another and that news group selection can be used to define mutually exclusive clusters. More effort is required if the user has not selected a particular category of web pages and the web pages are not already divided into mutually exclusive categories.

An automatic system can be employed to place web pages, or other display opportunities, into pre-defined clusters. A number of automatic text-based classification systems have been developed and any suitable automatic classification system can be used to divide web page among clusters. A naïve Bayes classifier can be used, for example, given a suitable set of manually classified training examples.

According to a further aspect of the invention the clusters are not manually pre-defined, but rather a learning probabilistic model, such as a Bayesian model or a neural network, is employed to develop effective definitions of clusters. The model parameters, and in some cases the model structure, is learned from data that relates user behavior to utilities data. Learning probabilistic models from such data are useful for generating effective cluster definitions. An effective definition of clusters is one that provides strong correlations between cluster identity and the utilities of presented impressions.

Examples of suitable Bayesian models for defining clusters include naïve Bayes models and Bayesian belief networks. In a naïve Bayes model, there is a single hidden (unobserved variable) that corresponds to cluster identity and is predictive of both presentation opportunity characteristics and utilities for various impressions. In a naïve Bayes model, the presentation opportunity characteristics and utilities are treated as conditionally independent, given the hidden variable value. The number of clusters can be determined as part of the learning process by learning the best parameters for models with different numbers of clusters and selecting the model with the number of clusters that best fits (is probabilistically most consistent) with the data.

As an example of how the naïve Bayes model works, the case will be considered where the presentation opportunity characteristic $C_1, C_2, \ldots, C_n$ are all binary variables, with values $c_1, c_2, \ldots, c_n$ that are either one for true or zero for false. In this case, the model has parameters $\theta_{ij}$ that are the probabilities that the $C_i$ are true given that the hidden variable value is $h_j$. The model has additional parameters giving the utilities as functions of $h_j$. According to the model the probability of observing the set of characteristics $c_1, c_2, \ldots, c_n$ given that the hidden variable has value $h_j$, $P(c_1, c_2, \ldots, c_n | h_j)$, is given by:

$$P(c_1, c_2, \ldots, c_n | h_j) = p_j \prod_{i=1}^{n} (\theta_{ij} c_i + (1 - \theta_{ij})(1 - c_i)) \quad (1.0)$$

where $p_j$ is the fraction of presentation opportunities falling into cluster $h_j$. The $p_j$ are determined from the training data as part of the training process. In applying the model, the cluster identity for a presentation opportunity is the cluster identity for which expression (1.1) is highest.

Figure 2:
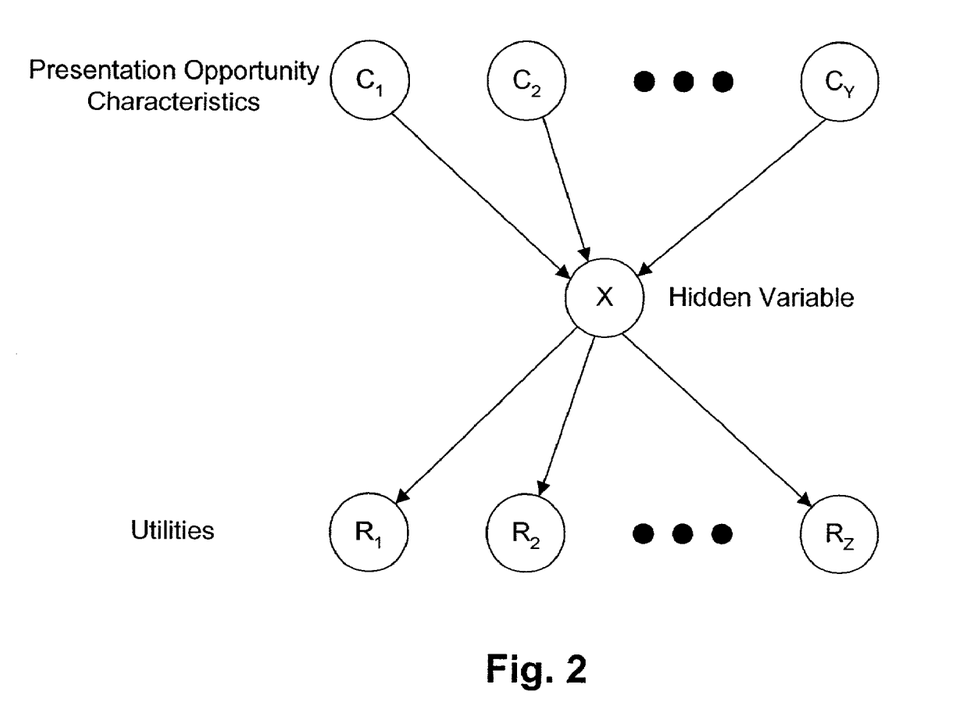
FIG. 2 is an illustration of a Bayesian belief network structure for clustering presentation opportunities.

While good results can be achieved defining the clusters with a naïve Bayes model, FIG. 2 illustrates a Bayesian belief network having a structure that is particularly well suited to providing effective cluster definitions. This structure can be referred to as a bottleneck architecture. The presentation opportunity characteristics, $C_1, C_2, \ldots, C_Y$, are treated as being predictive of a single hidden variable, X. The variable X is the cluster variable. $R_1, R_2, \ldots, R_Z$ are the utilities for each of impressions $IM_1, IM_2, \ldots, IM_Z$. The single hidden variable, X, can be replaced by several variables without fundamentally changing the model. If there are several hidden variables, there is one cluster for each possible combination of hidden variable values. The number of values for the hidden variable, as well as its relation to the presentation opportunity characteristics, is learned from prior knowledge and/or data. In training the model, the model parameters are tuned with the objective of selecting the parameters, and thus the cluster definitions, that are most effective in predicting the utilities. This contrasts with the naïve Bayes model, wherein the model parameters are fit to the presentation opportunity characteristics in addition to the utilities. As with the naïve Bayes model, the number of clusters is determined by trying different numbers of clusters and comparing the results.

A variety of functional forms, with varying numbers of parameters, can be used to express the relationship between the presentation opportunity characteristics and the probabilities for the hidden variable to take on each of its possible values. An appropriate choice of parameters depends on the number of presentation opportunity characteristics, the amount of data, and any computational limitations. The number of presentation opportunity characteristics can be quite large. For example, there can be a different presentation opportunity characteristic for whether a user visited each of 1000 different web pages.

Where the number of presentation opportunity characteristics is large, a linear regression or softmax model is a convenient and effective way of modeling the relationship between the characteristics and the hidden variable. Specifically, the probability that the hidden variable has the value hj given the model parameters θij and a presentation opportunity with characteristics $c_i$, $p(h_j | c_1, \ldots, c_n, \theta_{1j} \ldots, \theta_{nj})$, is given by:

$$p(h_j | c_1, \ldots, c_Y, \theta_1, \ldots, \theta_Y) = \frac{\exp\left(\sum_{i=1}^{Y} c_i \theta_{ij}\right)}{\sum_{k=1}^{N_X} \exp\left(\sum_{i=1}^{Y} c_i \theta_{ik}\right)} \quad (1.2)$$

where $N_x$ is the number of clusters. The relationship between the hidden variables and the utilities for the various impressions is generally unconstrained and depends on the type of utilities being modeled. Where the utilities are click-throughs or sale versus no sale, the model can express the utility with one parameter, $\phi_{ij}$, the probability of a click-though or sale, for each impression and for each cluster. Where the utilities are gross revenue, additional parameters can optionally be used to encode such variables as the mean and standard deviation for the value of sales.

While there are advantages in using the same utilities throughout, the utilities used in defining the clusters are not required to be the same as those used in subsequent stages of the process of allocating impressions. For example, where the utilities targeted by the allocation process are measures of revenue, it may still be convenient to define the clusters using a sale-no sale utility measure. In general, a learning probabilistic model can be used to define the clusters without reference to utilities. For example, the naïve Bayes model can be used to define clusters in terms of presentation opportunity characteristics without reference to any utilities.

Learning the bottleneck architecture model is the process of finding values for the parameters $\theta_{ij}$, $\phi_{ij}$, and $N_X$ that tend to maximize the probability of the utilities observed in the training data:

$$\prod_{i=1}^{N_D} \prod_{j=1}^{N_X} p(h_j | c_1^i, \ldots, c_Y^i, \theta_{1j}, \ldots, \theta_{Yj}) p(R_{k(i)} = r^i | h_j, \varphi_{k(i)j}) \quad (1.3)$$

where $N_D$ is the number of training examples, superscripts identify data for particular training examples, the subscript $k_{(i)}$ identifies the particular impression presented in the training example, and the variable $r^i$ corresponds to the observed utility in training example i. Expression (1.3) reflects the fact that the probability of observing a particular response equals the sum over all clusters j of terms having the form probability that the training example is in cluster j times probability of a response to the impression if it was presented in cluster j. The probability for the data set as a whole is the product of the probabilities for each of the independent response observations (response present or response absent) the data set contains.

There are a variety of methods by which the parameters $\theta_{ij}$, $\phi_{ij}$, and $N_X$ can be determined (learned) from the data. Suitable methods include gradient descent, stochastic gradient descent, Monte Carlo methods, and EM (expectaion-maximization) algorithms. Generally, these are iterative methods that find local maximums for the Expression (1.3). Therefore, to increase the probability of finding the global maximum, or a better approximation thereto, it is desirable to apply whichever methods is used a plurality of times using random perturbations for the initial values of the model parameters.

An example of a generalized EM algorithm for maximizing Expression (1.3) can be divided into the following three steps, to be repeated until convergence:

Step 1: for each case and cluster j calculate:

$$p(h^i = h_j | r^i, c_1^i, \ldots, c_Y^i, \theta^n, \varphi^n) = \frac{p(r^i | h_j, \varphi^n)p(h_j | c_1^i, \ldots, c_Y^i, \theta^n)}{\sum_{k=1}^{N_X} p(r^i | h_k, \varphi^n)p(h_k | c_1^i, \ldots, c_Y^i, \theta^n)}$$

Step 2: find the set of parameters $\theta^{n+1}$ to maximize:

$$\sum_{i=1}^{N_D} \sum_{j=1}^{N_X} p(h^i = h_j | r^i, c_1^i, \ldots, c_Y^i, \theta^n, \varphi^n) \log p(h_j | c_1^i, \ldots, c_Y^i, \theta^{n+1})$$

Step 3; find the set of parameters $\phi^{n+1}$ to maximize:

$$\sum_{i=1}^{N_D} \sum_{j=1}^{N_X} p(h^i = h_j | r^i, c_1^i, \ldots, c_Y^i, \theta^n, \varphi^n) \log(R_{k(i)} = r^i | c_1^i, \ldots, c_Y^i, \varphi^{n+1})$$

In step 1, probabilities for the various possible states (values) of the hidden variable are calculated for each data point taking into consideration the observed utility. This step is accomplished by direct application of the model using the current parameters estimates. To carry out the second step, the derivatives of the objective function with respect to the model variables are computed and small steps are taken in the direction of the gradient until a local minimum is found. In stepping along the direction of the gradient, a search is usually conducted to find the step size the gives a best, or near best, improvement in the objective function. Step 3 can be carried out with a method similar to that used for Step 2, although with the unconstrained model, a mathematical expression for finding the maximum in Step 3 can often be determined readily. As with the naïve Bayes model, in applying the bottleneck architecture model, presentation opportunities are assigned to the cluster they most likely belong to according to the model and the presentation opportunity characteristics.

When system 100 employs characteristics of a presentation opportunity that relate to the identity of the recipient, the recipient's privacy can be a concern. For example, the recipient may object to a system that tracks buying history. However, there are presentation opportunity characteristics relating to the identity of the recipient that generally do not raise privacy concerns. In a web based system, a classification of the web page a user is viewing can be characteristic of the user without being the type of information a user would object to being employed in selecting an impression to display to the user. If, a web page relates to one of sports, health, or investment, that information can be used without raising privacy concerns.

The cluster capacities 124 are rates of occurrence for presentation opportunities in various clusters. For example, in the case of clusters defined in terms of web page subject matter, the clusters capacities are rates at which users access web pages within the various subject matter groupings. The input system 110 obtains input regarding these cluster capacities. The input can comprise data, which can be obtained, for example, by monitoring a forum in which the presentation opportunities occur.

The utilities 126 are related to response rates realized by impressions 120. The utilities 126 are related to either cluster identity or specific presentation opportunity characteristics. The input can include estimates of utilities and/or utility data. Utilities data can be obtained by monitoring responses to impressions 120. Randomly or uniformly distributing impressions among presentation opportunities during data gathering is advantageous from the point of view of obtaining statistically reliable data. However, data can also be gathered during targeting of impressions.

Data gathered during targeting can be used to refine the targeting and target new impressions. To facilitate ongoing data gathering, a small percentage of the impressions can be presented randomly or uniformly across the clusters. Randomly or uniformly presenting a small percentage of the impressions provides data for each impression in each cluster. Otherwise, certain impressions may never be shown in certain clusters and utility estimates for those impressions in those clusters may remain inaccurate or become outdated.

The response can be any measurable result that has a utility for the impression purveyor. For example, a response to a banner advertisement on a web page can be, for example, clicking on that ad and consequently having the web browser visit the advertiser's site, buying a product, or increasing awareness of a brand or product. Similarly, a response to an audio advertisement can be, for example, requesting more information, buying a product, or increasing brand awareness.

Figure 3:
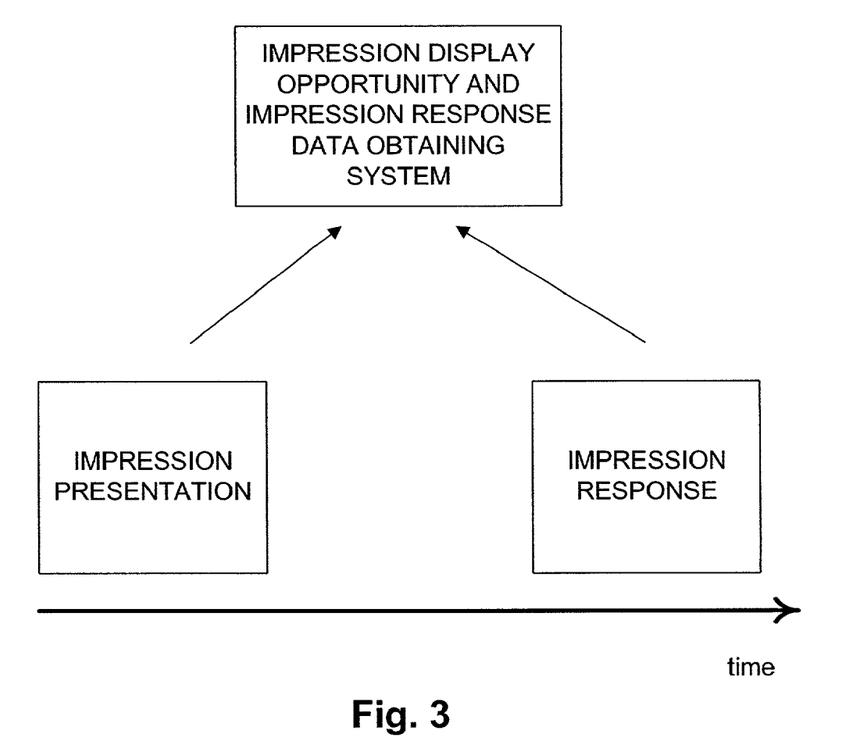
FIG. 3 is a schematic showing a temporal displacement between an impression presentation and an engendered response according to another aspect of the present invention.

The method of determining whether an impression has engendered a response depends on the type of impression and the type of the response. Measuring click-through rates on web-based advertisements is straightforward in that a click-through is easily (and typically) logged by the site presenting the advertisements. On the other hand, as illustrated in FIG. 3, the response may occur at a time subsequent to that in which the impression is presented. In such a circumstance, the relationship between the response and the presentation is a more involved determination.

Where the response is a sale, relating the response to a presentation can involve tracking the user. One way of tracking a web user is to employ URLs. When a user arrives at a web site by clicking-through on an ad impression, the web site can note the information in a URL and maintain the information as the user navigates through the web site. If a sale occurs, the sale and/or the dollar amount thereof can be recorded and associated with the purchaser having viewed the ad impression.

If the recipient of a presentation makes a purchase through another media, for example by phoning in the order, the relationship to the ad can be determined if sufficient information on the recipient is available at the time the recipient responds to the impression and when the recipient makes the purchase. For example, if the recipient's e-mail address is available both when the impression is displayed and when a purchase is made, that information can be used to relate the purchase to the presentation. Where sufficient information about the recipient is not available at the time the impression is presented or at the time a purchase is made to relate the presentation to the purchase, the relationship, or lack thereof, can be investigated through surveys. The time of sale can be a good time to conduct a survey, although other times can also be suitable depending on the product and sales volume.

A response such as increasing brand awareness is generally determined through surveys, which can be taken at any suitable time and location. The surveys can include questions that relate directly or indirectly to whether the subject received the impression. For example, a survey can ask whether the subject observed the impression. Alternatively, the survey can ask questions regarding factors such as demographics and/or browsing habits from which a belief that the subject saw the impression can be developed. For example, if Asian women are known to frequent a particular web site, an increase in brand awareness among Asian women can be correlated, where appropriate data is available, to an advertising campaign carried out on that web site.

Utilities 126 can be estimated from data and other input obtained by system 110. Any suitable method can be used to estimate the utilities. Examples include maximum likelihood, MAP methods (e.g., using Dirichlet priors), or a hierarchical Bayesian approach. The utilities can be estimated from prior knowledge, impression response data, or a combination of the two. Prior knowledge can be encoded by any suitable method, including, for example, "imagined future data" and "equivalent samples".

The utilities can relate to individual characteristics of presentation opportunities, groups of characteristics of presentation opportunities, or cluster identity. For example, there can be a utility for presenting an impression to a user who is a sports page viewer. There can also be a utility for presenting an impression to a user who is a sports page viewer over 35 years of age with the impression being presented as a banner at the top of a web page. These types of utilities can be employed in rule-based approaches to allocating the impressions.

As previously noted, however, according to one aspect of the invention, the presentation opportunity characteristics are divided into clusters such that each presentation opportunity falls into exactly one cluster. In that case, the utilities are of the form: expected value of presenting (a single) impression (i) in cluster (j). An expected value is the probability of engendering a response multiplied by the value of that response. When the utilities have this form, it is particularly easy to solve optimization problems involving the utilities and constraints, such as those relating to quotas.

Impression-assigning system 114 employs the utilities in allocating impressions 120 among prospective presentation opportunities. The utilities can be employed in any suitable manner. However, in one aspect of the invention the utilities are employed to form terms of an objective function that is maximized (or minimized), optionally subject to one or more constraints. The objective function generally relates to maximizing an aggregate utility. The aggregate utility can be any utility that can be estimated from the utility input, including for example, click-through rates for all the impressions together, a purchase rate, a dollar amount of purchases, profits on purchases, or brand awareness. The aggregate utility can be a value to a presentation opportunity provider's customers, such as advertisers, or can be a value to the presentation opportunity provider.

Selecting impressions to maximize an aggregate utility comprises selecting the impressions in accordance with the solution to an optimization problem. The optimization problem can be expressed mathematically and solved by conventional methods. For example, if the utility of impression i in cluster j (that is, impression i presented in a presentation opportunity of cluster j) is represented by $u_{ij}$, the rate at which presentation opportunities in cluster j occur is represented by capacity $c_j$, and the outcome being optimized is the total response rate, than the optimization problem can be expressed: Find $x_{ij}$, the rates at which impressions i are shown in clusters j, to maximize:

$$\sum_{ij} u_{ij} x_{ij} \quad (1)$$

subject to the constraints:

$$\sum_i x_{ij} \leq c_j \quad (2)$$

Expression (1) is an objective function representing the total response rate. The total response rate is the sum over all the clusters and all the impressions of the response rates engendered by each impression in each cluster. The terms of the objective function represent, for each impression and each cluster, the utility of presenting the impression in the cluster multiplied by the rate at which the impression is presented in the cluster. Expression (2) is a set of constraints relating to cluster capacities ($c_j$). The constraints require that the rates at which impressions i are shown in cluster j summed over all the impression must be less than or equal to the rate at which presentation opportunities occur in cluster j. Expressions (1) and (2) define a linear program. Linear programs can be easily solved using commercially available software implementing, for example, the Simplex Algorithm.

The objective function can include weighting factors, $v_i$:

$$\sum_{ij} v_i u_{ij} x_{ij} \quad (1a)$$

The optimization problem with expression (1a) is also a linear program. The weighting factors can be used to affect the target result. For example, when $u_{ij}$ are utilities in terms of absolute number of sales and $v_i$ are the dollar values of sales associated with impressions i, then expression (1a) maximizes the total dollar amount of sales. Instead of using utilities corresponding to numbers of sales and weighting factors based on dollar value of sales, an equivalent optimization problem can be defined using expression (1) without weighting factors, but utilities that are in terms of dollar values of sales. This shows that there are multiple ways of formulating the optimization problem to achieve a single result.

A variety of constraints can be included in the optimization problem. Constraints can take the form of quotas, $q_i$, which relate to the rates (numbers within a time period) at which impression i are to be shown. The constraints can be equalities:

$$\sum_j x_{ij} = q_i \quad (3a)$$

or inequalities:

$$\sum_j x_{ij} \geq q_i \quad (3b)$$

Expression (3a) requires that the quotas be exactly met, whereas Expressions (3b) require that the quotas be met or exceeded. The former are used, for example, when expression presentation opportunities are reserved for other purposes when they have not been sold to impression providers.

The quotas can also be for sets of impressions, $S_k$. The resulting constraints have the form:

$$\sum_{j, i \in S_\lambda} x_{ij} = q_k \text{ and:} \quad (3c)$$

$$\sum_{j, i \in S_\lambda} x_{ij} \geq q_k \quad (3d)$$

The former expression specifies that the rate at which impressions within set k are shown, summed over all impressions i in set $S_k$ and all clusters j, equals the quota for set k, which is $q_k$. The later expression specifies that the rate at which impressions within set k are shown, summed over all impressions i in set $S_k$ and all clusters j, is greater than or equal to the quota for that set.

The optimization problem with constraints corresponding to quotas can be easily solved. Expressions (1) and (2) together with expressions of the types (3a), (3b), (3c), and/or (3d) still define a linear program that can be solved with conventional methods and tools.

A potential result of allocating presentations according to one of the foregoing optimizations is that the total utility from a particular impression, or group of impressions, can be significantly lower than it is if the impressions are allocated by hand or randomly. For example, a particular advertiser may have initially allocated its ads as it saw fit (perhaps randomly) and then allowed its ads to be re-allocated according to one of the foregoing optimizations. The result of the re-allocation could increase the total utility from all ads in the system (e.g. Expression 1 is maximized), yet lower the aggregate utility from the ads of the particular advertiser. Additional constraints can be added to ameliorate or prevent this type of occurrence. These constraints can take the form:

$$\sum_j u_{ij} x_{ij} \geq L_i \text{ or} \quad (4a)$$

$$\sum_{j, i \in S_\lambda} u_{ij} x_{ij} \geq L_k \quad (4b)$$

In these expressions, $L_i$ is the minimum response rate for impression i, and $L_k$ is the minimum utility for the set of impression $S_k$. Expression (4a) establishes minimum utilities to be realized by individual impressions. Expression (4b) establishes minimum utilities to be realized by groups of impressions, such as all the impressions belonging to one advertiser. With constraints of the type (4a) and (4b), the optimization problem is still a linear program.

Constraints can also be added to forbid the presentation of certain impressions in certain clusters. For example, where there is a legal or moral issue with respect to showing an impression i to within a group of clusters F, constraints of the form:

$$x_{ij} = 0 \text{ for } j \epsilon F \quad (5)$$

can be employed to prevent impression i from being shown to in clusters of the group F. When no data is available on a utility $u_{ij}$, the reason may be that the impression i was intentionally not shown to cluster j. Therefore, it can be prudent to adopt a constraint of the form (5) whenever there is no data pertaining to a utility $u_{ij}$.

An issue that arises in allocating impressions based on utilities is that the solution can be highly sensitive to statistically insignificant variations in the utilities or utility estimates. For example, suppose that two impressions have equal utilities when presented in two different clusters. Suppose that the utilities pertain to click-through rates, there are 1000 data points for each impression and each cluster, and the actual utilities are 0.5 for each impression in each cluster. For one cluster, the data might show 501 clicks for one impression and 498 clicks for another, giving utility estimates of 0.501 and 0.498 respectively. In another cluster, the utility estimate could be 0.499 for the one impression and 0.500 for the other. From these estimates, the utility for one impression appears higher in the first cluster while the utility for the other impression appears higher in the other cluster. As a result of these minor variations, the solutions to the optimization problems described above can result in all presentations of the one impression being allocated to one cluster while all presentations of the other impression are allocated to the other cluster. In some cases, however, there is a value in distributing impressions uniformly among the clusters, at least to some extent. Therefore, it can be desirable to employ a method that prevents small or insignificant variations among utilities from causing highly skewed distributions of impressions.

One method is to cluster the utilities so that any two utilities are made equal if there is no statistically significant difference between them. For example, the utilities might be ordered from lowest to highest and adjacent utilities might be set to their average whenever any adjacent pair have no statistically significant difference.

A method that does not rely on statistics is to divide the utilities into ranges or buckets and to replace all utilities within a range with a single value. In one implementation of this method the target number of buckets, which can be 5, 10 or 20 for example, is chosen in advance. Initially, each utility is placed in its own bucket. While there are more than the target number of buckets, the mean value in each bucket is calculated and the two buckets with the closest means are merged into one. When the number of buckets is reduced to the target number, the utilities are set to the mean values for the respective buckets the utilities fall in.

Where utilities have been bucketed, or otherwise made equal, there can be many solutions to the optimization problem. In other words, many sets of values for the presentation rates, $x_{ij}$, can be equally satisfactory from the point of view of satisfying the optimization problem. A further step can be taken when there is a value in presenting the impressions uniformly among clusters. The step can involve solving a second optimization problem to find the solution to the first optimization problem that provides the most uniform distribution of impressions. For example, the solution to the first optimization problem will give C, the maximum response rate. The second optimization problem can then be to minimize the objective function:

$$\sum_{ij} \left| x_{ij} - \frac{q_i}{m} \right| \qquad (6)$$

subject to the constraints used in solving the first optimization problem plus a constraint that ensures the response rate will be the maximum as determined from solving the first optimization problem:

$$\sum_{ij} u_{ij} x_{ij} = C \qquad (7)$$

Using a well known transformation, the absolute values are eliminated from equation (6), whereby the optimization problem, which includes expression (7) together with constraints of the kind previously described, gives rise to a linear program which can be solved easily.

A transformation eliminating the absolute value in expression (6) from the optimization problem can be accomplished by defining $y_{ij}$ and $z_{ij}$:

$$y_{ij} = x_{ij} - \frac{q_i}{m} \text{ and } z_{ij} = 0 \qquad \text{for } x_{ij} \geq \frac{q_i}{m}$$

$$y_{ij} = 0 \qquad \text{and } z_{ij} = -\left(x_{ij} - \frac{q_i}{m}\right) \text{ for } x_{ij} < \frac{q_i}{m}$$

whereby $$x_{ij} = y_{ij} + \frac{q_i}{m} - z_{ij} \qquad (8)$$

The optimization problem then becomes finding $y_{ij}$ and $z_{ij}$ to maximize $$\sum_{ij} y_{ij} + z_{ij} \qquad (6a)$$

Subject to the constraints $$y_{ij} \geq 0$$

$$z_{ij} \geq 0$$

and the constraints of the original problem wherein $x_{ij}$ are replaced using expression (8).

Other methods of giving some weight to a uniform distribution are also available. For example, the first optimization problem can be redefined to maximize the objective function $$\sum_{ij} u_{ij} x_{ij} + W \left| x_{ij} - \frac{q_i}{m} \right| \qquad (9)$$

where W is an arbitrary weight that determines the relative importance of maximizing a response and keeping a measure of uniformity. The magnitude of W depends on the mean sizes of the utilities $u_{ij}$ as well as the weight to be given to achieving uniformity. Suitable values for W can be, for example, 0.1, 0.001, or 0.00001. Again, a transformation is used to eliminate the absolute value, whereby expression (9) and constraints of the type previously described form a linear program.

The solution of the optimization problem gives presentation rates by cluster, $x_{ij}$. The $x_{ij}$ define an allocation of impressions i among clusters j. Any method of implementing the allocation is suitable provided it results in impressions i being shown in clusters j at rates close to or approaching $x_{ij}$. One method is to randomly present impressions in cluster j using the $x_{ij}$ as weights. In other words, an impression can be selected for a presentation opportunity in cluster j by a random process in which the probability of selecting impression i is:

$$\frac{x_{ij}}{\sum_i x_{ij}}$$

Another method is to determine the total number of impressions of each type to show in a cluster j within a fixed period of time, such as a day, place all these impressions in a queue, and randomly select from that queue until the queue is empty. In this regard, it should be noted that a number within a time period is a rate.

Figure 4:
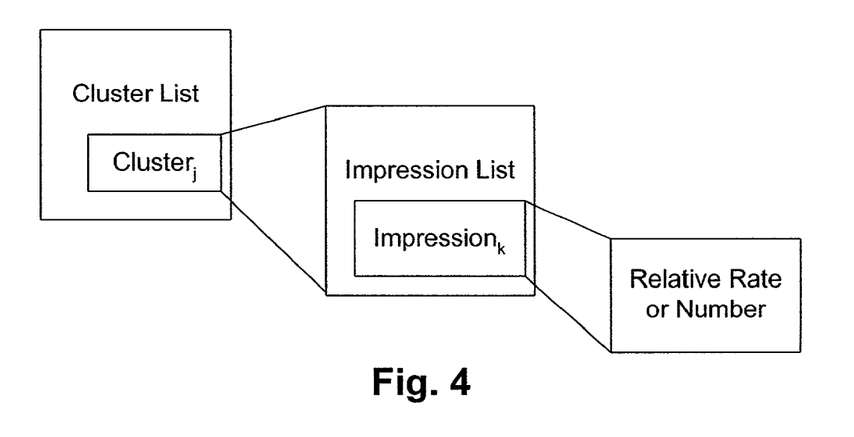
FIG. 4 is a schematic of a data structure according to a further aspect of the present invention.

The allocation determined from the utilities and constraints can be stored in a data structure. FIG. 4 is a schematic illustration of an exemplary data structure. The exemplary structure contains a list of cluster elements j, which correspond to the clusters. For each element j, there is a list of impression elements k. There are at least as many impression elements k as there are impressions i for which $x_{ij}$ is not zero. For each impression, the data structure provides a number corresponding to the relative rate or number of times that impression i is to be shown in cluster j.

Figure 5:
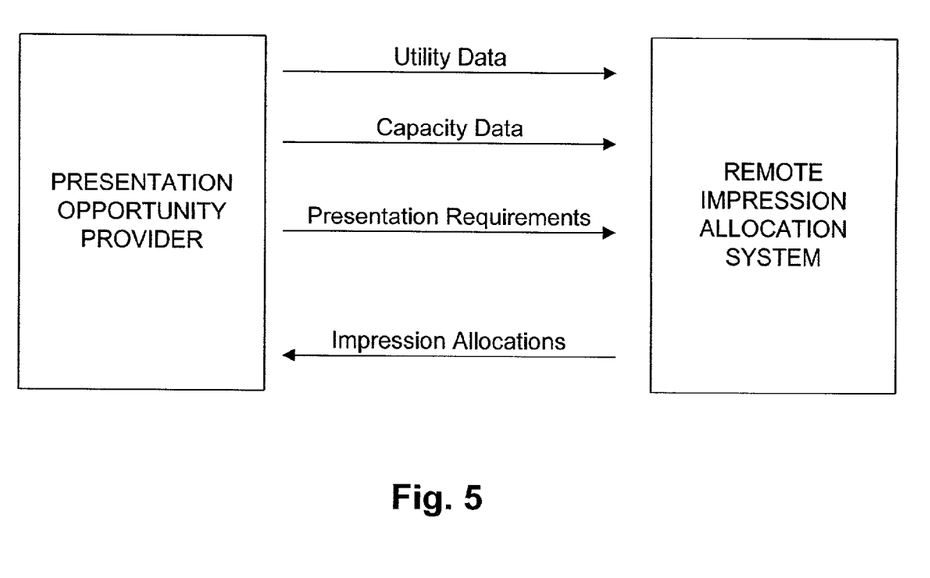
FIG. 5 is a high level schematic of a method of obtaining impression allocations according to a further aspect of the present invention.

In a method of the invention, illustrated in FIG. 5, the optimization problem is solved in a remote location. A presentation opportunity provider submits input relating to utilities, presentation opportunity occurrence rates, and quotas to a remote location. At the remote location, the allocation is determined based on the input. The allocation is then received from the remote location. The sending and receive steps can take place electronically.

Figure 6:
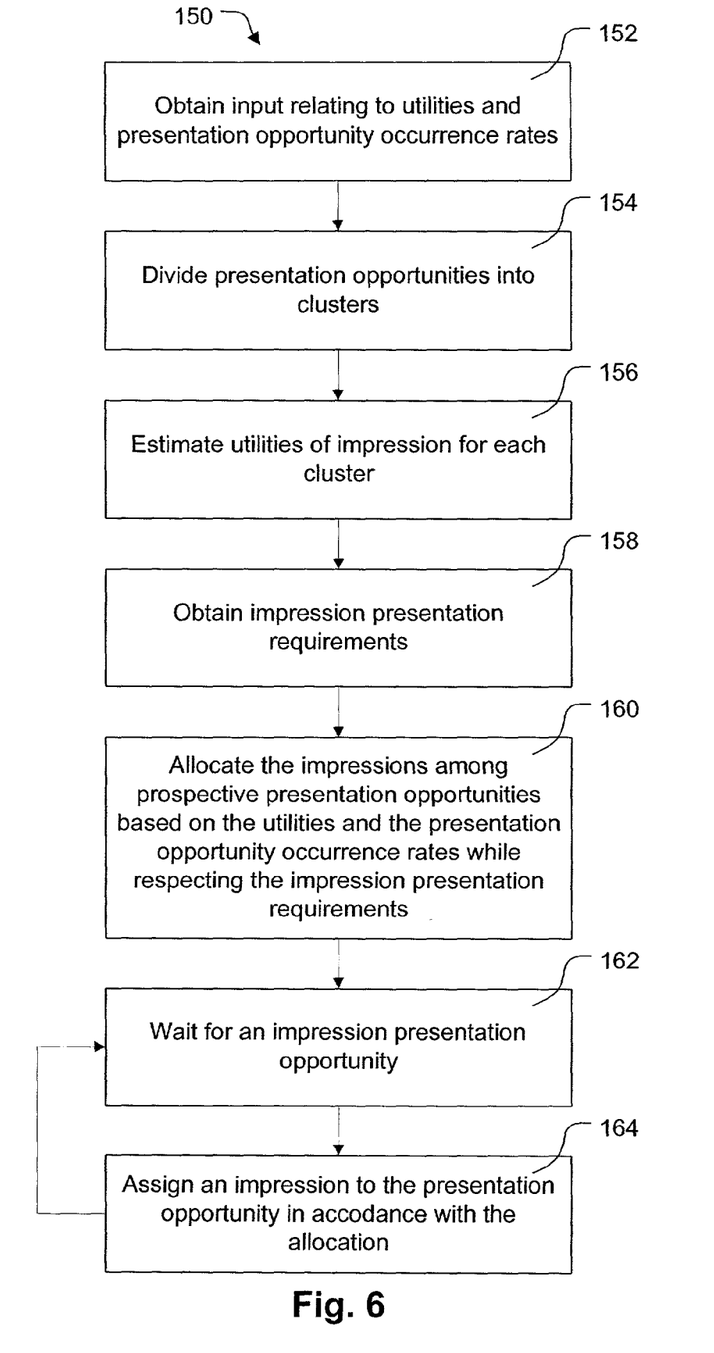
FIG. 6 is a flow diagram of a process provided by a further aspect of the present invention.

FIG. 6 presents a method 150 of assigning impressions to presentation opportunities. The method comprises a group of actions or processes. Act 152 is collecting input regarding response rates to the impressions and rates of occurrence of presentation opportunities. The responses measured can pertain to responses that occur outside the time frames during which the impressions engendering the responses are presented.

Act 154 is dividing the presentation opportunities into clusters according to the presentation opportunity characteristics, such that each presentation opportunity belongs in one of the clusters. The rates of occurrence of presentation opportunities for each cluster are estimated from the input during this process.

Act 156 is employing the impression response input in estimating utilities for each impression in each cluster. Prior knowledge can also be used in estimating the utilities and the utilities can be modified to eliminate insignificant differences or bucket the values.

Act 158 is an optional procedure of obtaining presentation requirements. The requirements can be of various types. For example, they can be quotas that pertain to the minimum number of times certain impressions, or groups of impressions, are to be shown. They can also enforce other restrictions, such as requirements that certain impressions receive a minimum number of responses or that certain impressions not be shown in certain clusters. The presentation requirements can be obtained before or after the impression response data.

Act 160 is allocating the impressions among the presentation opportunities based on the utilities, the presentation opportunity occurrence rates, and the presentation requirements. Generally, the utilities and the occurrence rates are employed in terms of an objective function that is optimized subject to constraints that include the presentation requirements. The optimization problem is generally a linear program, which is easily solved. Where the optimization problem has multiple solutions, the solution that gives the most uniform distribution of impressions among the clusters can be selected.

Act 162 begins the implementation of the impression allocation. Act 162 is waiting for a presentation opportunity. When one arrives, its cluster is determined as part of act 164. From the allocation to that cluster, an impression is assigned to the opportunity. Where several impressions are assigned to the cluster, as is commonly the case, one is selected at random. The allocation includes rates at which the various impressions are to be shown within the cluster. The random selection is weighted so that over time the relative rates at which the various impressions are presented in the cluster approach the relative rates determined by the allocation.

The effectiveness of allocating impression to maximizing click-through rates using methods of the invention has been verified by experiments carried out on a news site. A passive experiment was preformed on the entire site. That is, the impression allocations were not actually implemented in this first experiment. The news site was organized into page groups, where each page group corresponds to a broad class of news stories. At the time of the experiment, there were roughly 20 page groups and roughly 500 advertisements. Examples of page groups include a sports page group and a technology page group. The page groups were used to determine clusters. In particular, when a user visited a particular page on news site, the corresponding page group of that page defined the cluster for the presentation opportunity created by that visit.

Advertisements were normally scheduled on the new site manually. Advertisers would buy impression presentations on certain page group. For example, an advertiser might choose to buy 1000 impressions for the sports group and another 1000 impressions for the technology group. Impressions sold within a particular page group were randomly served to users that visited pages within that page group.

Impression response (click-through) and presentation opportunity data was obtained from two days of logs. The roughly 1.6 million advertisement presentations from the first day were used to estimate utilities (click-through probabilities) and presentation opportunity occurrence rates (numbers of visitors to each web page group per day). Each probability was estimated using an average of 4,000 data points. An optimization problem employing the probabilities and rates was solved to identify the impression allocation that maximized the expected number of clicks.

The experiment was passive in that the data from the second day was used to estimate how well the resulting allocation would have worked. In particular, the data from the second day—which consisted of roughly the same number of page views as the first—was used to re-estimate all of the $u_{ij}$ values. These re-estimated utilities were used to determine the expected number of clicks-throughs that would have resulted had the allocation determined from the optimization been employed. It was found that optimization would most likely have resulted in 20 to 30 percent more click-throughs than actually took place.

A non-passive experiment was run with one advertiser on the news site. The advertiser had five advertisements running across the site. In this experiment, the utilities were estimated using two days of web logs. Each utility was estimated using roughly 15,000 data points. These utilities were replaced as described above to place the utilities into roughly ten buckets. Using these utilities, an optimization problem was solved to identify a schedule with maximum click-throughs. A secondary optimization using the maximum click-throughs determined by the first experiment as a constraint, was used to identify the most uniform optimal schedule. The schedule was implemented over a weekend and resulted in a 30 percent increase in click-through rates. This was the same as the expected increase determined from the training data. The click-through rates of advertisements that were not allocated according to the solution to an optimization problem did not increase.

A passive approach, which was validated by the foregoing experiments, was also used to test the effect of allocating advertisements based on utilities and respecting quotas. The quotas specified the numbers of times impressions were to be shown. With clusters defined by web-page group, the allocation resulting from maximizing the total click-through rate subject to the quotas gave a 20 percent increase in click-through rates. With clusters defined by the Bayesian net-clustering approach, however, the increase was 40 percent.

Figure 7:
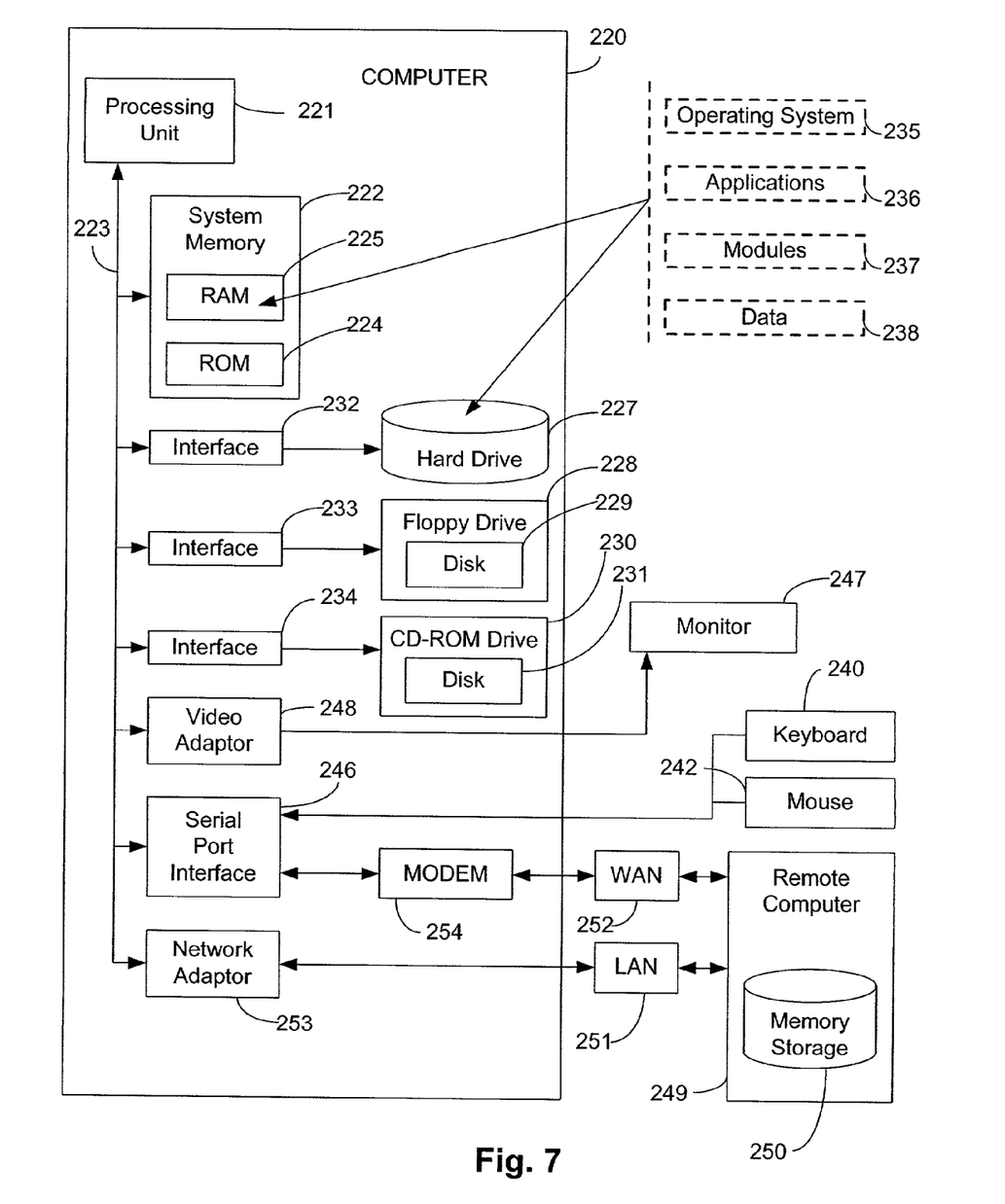
FIG. 7 is an example of an operating environment for the present invention.

With reference to FIG. 7, an exemplary system of the invention includes a conventional personal or server computer 220, including a processing unit 221, a system memory 222, and a system bus 223 that couples various system components including the system memory 222 to the processing unit 221. The processing unit 221 can be any of various commercially available processors. Dual microprocessors and other multi-processor architectures also can be used as the processing unit 221.

System bus 223 can include a memory bus or memory controller, a peripheral bus, and a local bus using any of a variety of commercially available bus architectures. The system memory 222 includes read only memory (ROM) 224 and random access memory (RAM) 225. A basic input/output system (BIOS), containing the basic routines that help to transfer information between elements within the computer 220, such as during start-up, is stored in ROM 224.

The computer 220 further includes a hard disk drive 227, a magnetic disk drive 228, e.g., to read from or write to a removable disk 229, and an optical disk drive 230, e.g., for reading a CD-ROM disk 231 or to read from or write to other optical media. The hard disk drive 227, magnetic disk drive 228, and optical disk drive 230 are connected to the system bus 223 by a hard disk drive interface 232, a magnetic disk drive interface 233, and an optical drive interface 234, respectively. The drives and their associated computer-readable media provide nonvolatile storage of data, data structures, computer-executable instructions, etc. for the server computer 220. Although the description of computer-readable media above refers to a hard disk, a removable magnetic disk and a CD, other types of media that are readable by a computer, such as magnetic cassettes, flash memory cards, digital video disks, Bernoulli cartridges, and the like, can also be used in the exemplary operating environment. A number of program modules can be stored in the drives and RAM 225, including an operating system 235, one or more application programs 236, other program modules 237, and program data 238.

A user can enter commands and information into the computer 220 through a keyboard 240 and pointing device, such as a mouse 242. Other input devices (not shown) can include a microphone, joystick, game pad, satellite dish, scanner, or the like. These and other input devices are often connected to the processing unit 221 through a serial port interface 246 that is coupled to the system bus 223, but can be connected by other interfaces, such as a parallel port, game port or a universal serial bus (USB). A monitor 247 or other type of display device is also connected to the system bus 223 via an interface, such as a video adapter 248. In addition to the monitor, computer 220 typically includes other peripheral output devices (not shown), such as speakers and printers.

The computer 220 can operate in a networked environment using logical connections to one or more remote computers, such as a remote server or client computer 249. The remote computer 249 can be a workstation, a server computer, a router, a peer device or other common network node, and typically includes many or all of the elements described relative to the computer 220, although only a memory storage device 250 has been illustrated in FIG. 11. The logical connections depicted in FIG. 11 include a local area network (LAN) 251 and a wide area network (WAN) 252. Such networking environments are commonplace in offices, enterprise-wide computer networks, intranets and the Internet.

When used in a LAN networking environment, the computer 220 is connected to the local network 251 through a network interface or adapter 253. When used in a WAN networking environment, the server computer 220 typically includes a modem 254, or is connected to a communications server on the LAN, or has other means for establishing communications over the wide area network 252, such as the Internet. The modem 254, which can be internal or external, is connected to the system bus 223 via the serial port interface 246. In a networked environment, program modules depicted relative to the computer 220, or portions thereof, can be stored in the remote memory storage device. The network connections shown are exemplary and other means of establishing a communications link between the computers can be used.

The present invention is described with reference to acts and symbolic representations of operations that are performed by the computer 220, unless indicated otherwise. Such acts and operations can be computer-executed. These acts and operations include the manipulation by the processing unit 221 of electrical signals representing data bits which causes a resulting transformation or reduction of the electrical signal representation, and the maintenance of data bits at memory locations in the memory system (including the system memory 222, hard drive 227, floppy disks 229, and CD-ROM 231) to thereby reconfigure or otherwise alter the computer system's operation, as well as other processing of signals. The memory locations where data bits are maintained are physical locations that have particular electrical, magnetic, or optical properties corresponding to the data bits.

The present invention is illustrated with respect to a computer architecture and particular examples, however, various programming methodologies and/or computer architectures suitable for carrying out the present invention can be employed and fall within the scope of the hereto appended claims.

As used in this application, "system" is a structure comprising one or more components. A "component" is a structure comprising computer hardware and/or software. For example, a component can be, but is not limited to, a computer readable memory encoded with software instructions or a computer configured to carry out specified tasks. By way of illustration, both an application program stored in computer readable memory and a server on which the application runs can be components. Due to the nature of components, multiple components can be intermingled and are often not separate from one another. Systems can likewise be intermingled and inseparable.

The invention has been described with reference to particular aspects of the invention. Obviously, modifications and alterations will occur to others upon reading and understanding the foregone detailed description. It is intended that the invention be construed as including all such modifications alterations, and equivalents thereof.

The invention claimed is:

1. A computer-implemented system that allocates advertisements to gain discrete dollar values among presentation opportunity clusters, comprising:
    an input obtaining computer system component that obtains expected utilities for advertisements to gain discrete dollar values when presented in the clusters, capacities for the clusters, and quotas for the advertisements, the advertisements are presented by a computer to engender a user response and result in a number representing the discrete dollar values; and
    an impression assigning computer system component that allocates the advertisements among the clusters based on the expected utilities, the capacities for the clusters, and the quotas, and modifies one or more of the utilities.

2. The system of claim 1, wherein the impression assigning computer system component allocates the advertisements in accordance with the solution to an optimization problem involving the expected utilities, the capacities for the clusters, and the quotas.

3. The system of claim 2, wherein the optimization problem comprises maximizing a utility function subject to constraints comprising the capacities and the quotas.

4. The system of claim 3, wherein the utility function is a sum taken over the clusters and over the advertisements of the quantity of each advertisement allocated to the cluster multiplied by the utility for the advertisement in the cluster.

5. The system of claim 2, wherein the optimization problem includes constraints specifying minimum utilities to be realized by groups of one or more advertisements.

6. The system of claim 2, wherein the optimization problem gives weight to obtaining a uniform distribution of the advertisements among the clusters.

7. The system of clam 1, wherein the utilities are of a type that cannot be determined within the time in which an advertisement resulting in the utility is presented.

8. A computer-implemented system for presenting advertisements to gain discrete dollar values, comprising:

an impression input module that receives advertisements to rain discrete dollar values, the advertisements are displayed by the computer to bring about a user action and result in a number representing the discrete dollar values;

a response and recipient input module that receives input relating to responses to the advertisements from recipients having various characteristics and input relating to numbers of prospective recipients having the various characteristics;

a quota input module that receives quotas for presenting the advertisements to the prospective recipients; and an impression serving module that selects the advertisements to present to the prospective recipients according to at least the response data, the recipient data, and the quotas.

9. The system of claim 8, wherein selecting the advertisements comprises solving an optimization problem involving the response data, the recipient data, and the quotas.

10. The system of claim 9, wherein the optimization problem is a linear program.

11. The system of claim 10, wherein the optimization problem comprises maximizing a utility function subject to constraints based on the recipient data and the quota data.

12. A computer-implemented method of selecting advertisements to gain discrete dollar values, comprising:

selecting advertisements to gain discrete dollar values based on user characteristics, frequencies with which users having a particular characteristic responded when presented with particular advertisements to gain discrete dollar values, and one or more constraints comprising constraints representing quotas for presenting particular advertisements to gain discrete dollar values, the advertisements are displayed by a computer to stimulate a user action and result in a number representing the discrete dollar values.

13. The method of claim 12, wherein selecting the advertisements comprises dividing users into clusters based on user characteristics and allocating advertisements to the clusters so as to maximize, subject to the constraints, an expected utility.

14. The method of claim 13, further comprising:
determining utilities for the advertisements in the clusters based on the user response rates; and
determining capacities for the clusters;
wherein selecting the advertisement is in accordance with the solution to an optimization problem involving the expected utilities, the capacities for the clusters, and the quotas.

15. The method of claim 14, wherein the optimization problem comprises maximizing a utility function subject to constraints comprising the capacities and the quotas.

16. The method of claim 15, wherein the utility function is a sum taken over the clusters and over the advertisements of the quantity of each advertisement allocated to the cluster multiplied by the expected utility for the advertisement in the cluster.

17. The method of claim 13, wherein the users are divided into clusters using a learning probabilistic model.

18. The method of claim 17, wherein the model is a Bayesian belief network model.

19. The method of claim 18, wherein the Bayesian belief network model is a bottleneck architecture.

* * * * *